A. P. SMITH.
Wagon-Brake.

No 69,035.

Patented Sept 17, 1867

WITNESSES:
J. J. Peyton
Baltis DeLong

INVENTOR:
Andrew P. Smith
by his attys
Baldwin & Son

UNITED STATES PATENT OFFICE.

ANDREW P. SMITH, OF GREENSBURG, PENNSYLVANIA, ASSIGNOR TO HIMSELF AND GEORGE BENNETT.

IMPROVEMENT IN WAGON-BRAKES.

Specification forming part of Letters Patent No. 69,035, dated September 17, 1867.

*To all whom it may concern:*

Be it known that I, ANDREW P. SMITH, of Greensburg, in the county of Westmoreland and State of Pennsylvania, have invented a new and useful Improvement in Wagon-Brakes, of which the following is a full, clear, and exact description, reference being had to the accompanying drawings, which make part of this specification, and in which—

Figure 1:
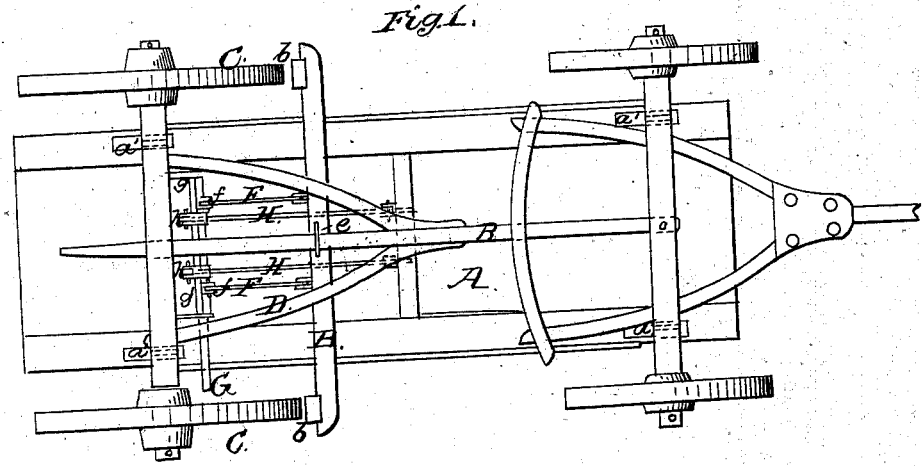
Figure 2:
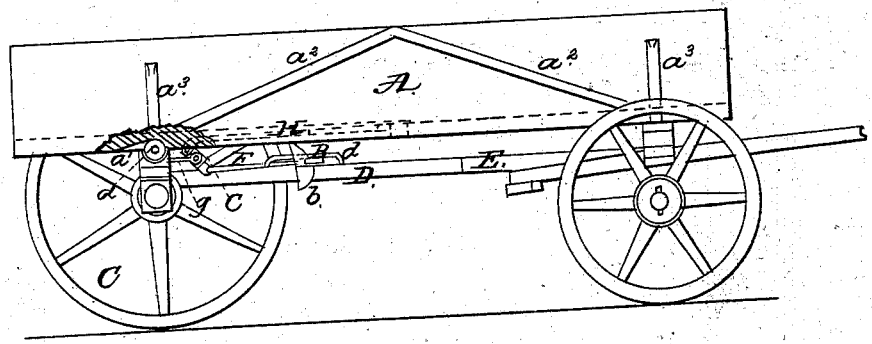

Figure 1 represents a plan view of a wagon to which my improvement is applied, turned upside down, and Fig. 2 a view in elevation of one side of the same, with one wheel removed and part of the frame broken away, to show the mechanism more clearly.

My invention relates to that class of brakes in which the pressure is applied to the wheels by the sliding of the wagon-body on its bolsters in going down hill; and my improvement consists in converting the ordinary hand-brake into an automatic one by connecting the rock-shaft which operates the rubbers with the wagon-body, in a novel manner hereinafter described.

In the accompanying drawings, my invention is shown as applied to an ordinary wagon.

The body A of the wagon, instead of being secured to the bolsters, rests upon small friction-rollers $a$ in the bolsters. These rollers are so arranged that they project above the bolsters into slots or grooves $a^1$ cut in the under side of the bed.

The front ends of the slots are nearly perpendicular, so as to prevent the body from rising from the bolsters and running too far back, but the slope of the bottom of the slot is more gradual at the back, so that, as the body slides forward in going down hill, it is lifted from the bolsters by the friction-rollers, so as to throw its entire strain on the brake-bar. The body is prevented from moving too far in either direction by stops $a^2$, which abut against the standards $a^3$.

The brake-bar B is furnished with rubbers $b$, arranged in front of the hind wheels C, and slides on the hounds D, and is held in position by a loop, $e$, on the coupling-pole E, and by loops $d$ on the hounds.

The brake-bar is connected with the lever-bar or rock-shaft G by link-bars F, pivoted to short arms $f$, projecting from the under front side of the rock-shaft.

The lever-bar is pivoted to turn axially in brackets $g$, projecting from the hind axle.

One end of the rock-shaft projects on one side of the body for the attachment of the handle. This forms the hand-brake in common use.

To render the brake self-acting, I attach two brake-rods, H, to the under side of the body A, near its middle, and pivot their other ends to short arms $h$, projecting from the upper rear side of the lever-bar G.

The operation of this device is such that, as the wagon descends an incline, the body rises and slides forward on its friction-rollers, which movement draws on the brake-rods H, turns the lever-bar or rock-shaft, and applies the brakes to the wheels. As soon as level ground is reached the strain on the brakes and the inclination of the bottom of the slots $a$ cause the body to slide back, and thus release the brakes.

I am aware that brakes have heretofore been applied by the sliding forward of the wagon-body on its bed, and therefore do not broadly claim this mode of operation; neither do I claim the brake by itself; but

Having thus fully described the construction and operation of my improved brake, what I claim therein as new, and desire to secure by Letters Patent, is—

The combination, with the running-gear of the wagon, of the sliding bed, the friction-rollers, the inclined slots, the draw-bars, the rock-shaft, and the brake-lever, the whole being constructed, arranged, and operating as described, for the purpose set forth.

In testimony whereof I have hereunto subscribed my name.

ANDREW P. SMITH.

Witnesses:
JACOB BEAUMONT,
JAMES C. BALDRIDGE.